United States Patent [19]

Kato

[11] Patent Number: 5,019,762

[45] Date of Patent: May 28, 1991

[54] INDUSTRIAL ROBOT APPARATUS

[75] Inventor: Hisao Kato, Inazawa City, Japan

[73] Assignee: Mitsubishi Denki Kabushiki Kaisha, Tokyo, Japan

[21] Appl. No.: 531,679

[22] Filed: Jun. 1, 1990

[30] Foreign Application Priority Data

Jun. 5, 1989 [JP] Japan .................................. 1-142628

[51] Int. Cl.⁵ ...................... G05B 19/42; B23Q 3/155
[52] U.S. Cl. ............................. 318/568.12; 318/568.2; 318/587; 29/568; 364/513; 901/3; 901/18
[58] Field of Search ................................. 318/560–640; 364/573; 901/3, 7–23, 30, 45, 27; 414/729–735; 29/568

[56] References Cited

U.S. PATENT DOCUMENTS

| | | |
|---|---|---|
| 4,260,942 | 4/1981 | Fleming . |
| 4,503,507 | 3/1985 | Takeda et al. ............... 318/568.2 X |
| 4,613,943 | 9/1986 | Miyake et al. ...................... 364/513 |
| 4,773,815 | 9/1988 | Lemelson ........................ 29/26 A X |
| 4,793,053 | 12/1988 | Zuccaro et al. ........................ 29/568 |
| 4,809,425 | 3/1989 | Monforte ........................ 29/26 A X |
| 4,841,431 | 8/1989 | Takagi et al. . |
| 4,875,275 | 10/1989 | Hutchinson et al. ................. 29/568 |
| 4,896,087 | 1/1990 | Onaga et al. ...................... 318/568.2 |
| 4,897,014 | 1/1990 | Tietze .............................. 29/568 X |
| 4,941,103 | 7/1990 | Kato .............................. 318/587 X |

FOREIGN PATENT DOCUMENTS

| | | |
|---|---|---|
| 222403 | 5/1987 | European Pat. Off. . |
| 214297 | 8/1987 | European Pat. Off. . |
| 346816 | 3/1989 | European Pat. Off. . |
| 8603865 | 2/1986 | PCT Int'l Appl. . |

Primary Examiner—Paul Ip
Attorney, Agent, or Firm—Sughrue, Mion, Zinn, Macpeak and Seas

[57] ABSTRACT

An industrial robot apparatus has a plurality of robots mounted for movement along a pathway. When a malfunction sensor detects a malfunction of one of the robots, a withdrawal controller withdraws the malfunctioning robot from the pathway, and the operation usually performed by the malfunctioning robot is allotted to one or more of the remaining normal robots by an operation allotter. A normal robot to which an operation is allotted is controlled by a hand replacement controller to replace its detachable hand with a hand corresponding to that of the malfunctioning robot.

5 Claims, 10 Drawing Sheets

INDUSTRIAL ROBOT APPARATUS

BACKGROUND OF THE INVENTION

This invention relates to an industrial robot apparatus which is suitable for carrying out various manufacturing processes. More particularly, it relates to an industrial robot apparatus which has a plurality of robots and which can continue to operate when one of the robots malfunctions.

Industrial robot apparatuses have been proposed which employ a plurality of robots mounted for movement along a common pathway. A number of processing machines, such as machine tools, are installed along the pathway. A part to be processed by the processing machines is carried by the robots from one processing machine to the next, and a series of manufacturing steps are sequentially performed on the part.

Generally, each of the robots provides parts to only specific ones of the processing machines along the pathway. Due to the layout of the pathway, the robots can not pass one another. Therefore, if one of the robots should malfunction and become unable to perform its allotted task, the remaining robots can not substitute for the malfunctioning robot, since they can not move along the pathway past the malfunctioning robot to a suitable position. When the processing machines perform sequential operations on parts, the flow of parts from machine to machine becomes impossible when even a single robot malfunctions, and the manufacturing operation must be halted.

SUMMARY OF THE INVENTION

Accordingly, it is an object of the present invention to provide an industrial robot apparatus which has a plurality of robots and which can continue to operate even when one of the robots malfunctions.

An industrial robot apparatus according to the present invention includes a pathway for guiding a plurality of robots. A withdrawal space for housing one or more malfunctioning robots is provided at each end of the pathway. When a malfunction sensor detects a malfunction of one of the robots, a withdrawal controller withdraws the malfunctioning robot into one of the withdrawal spaces. A substitute operation controller then controls one or more of the remaining robots to perform the operations usually performed by the malfunctioning robot. As a result, the robot apparatus can continue to function even with a malfunctioning robot.

In accordance with one form of the present invention, each robot is equipped with a detachable hand. Before a normal robot performs an operation in place of a malfunctioning robot, the normal robot is controlled to replace its hand with a different hand corresponding to that of the malfunctioning robot. The apparatus may include a hand storage area where a plurality of hands for the robots can be accessed by the robots.

The apparatus may also include a temporary storage area for parts where a normal robot can temporarily store a part which it is grasping in its hand. After the part has been temporarily stored, the normal robot is controlled to perform an operation in place of a malfunctioning robot.

In accordance with another form of the present invention, at least three robots are disposed on a pathway. When a malfunction sensor detects a malfunction of one of the robots, an operation allotter allots the operations which would normally be performed by the malfunctioning robot to one or more of the remaining normal robots, and the normal robots are controlled to perform the allotted operations.

An industrial robot apparatus according to the present invention is particularly suited for use in a manufacturing line having a plurality of processing machines arranged in sequence. The manufacturing line is not restricted to any particular type, and the processing machines can be any devices suitable for use with industrial robots.

DESCRIPTION OF THE PREFERRED EMBODIMENTS

Figure 1:
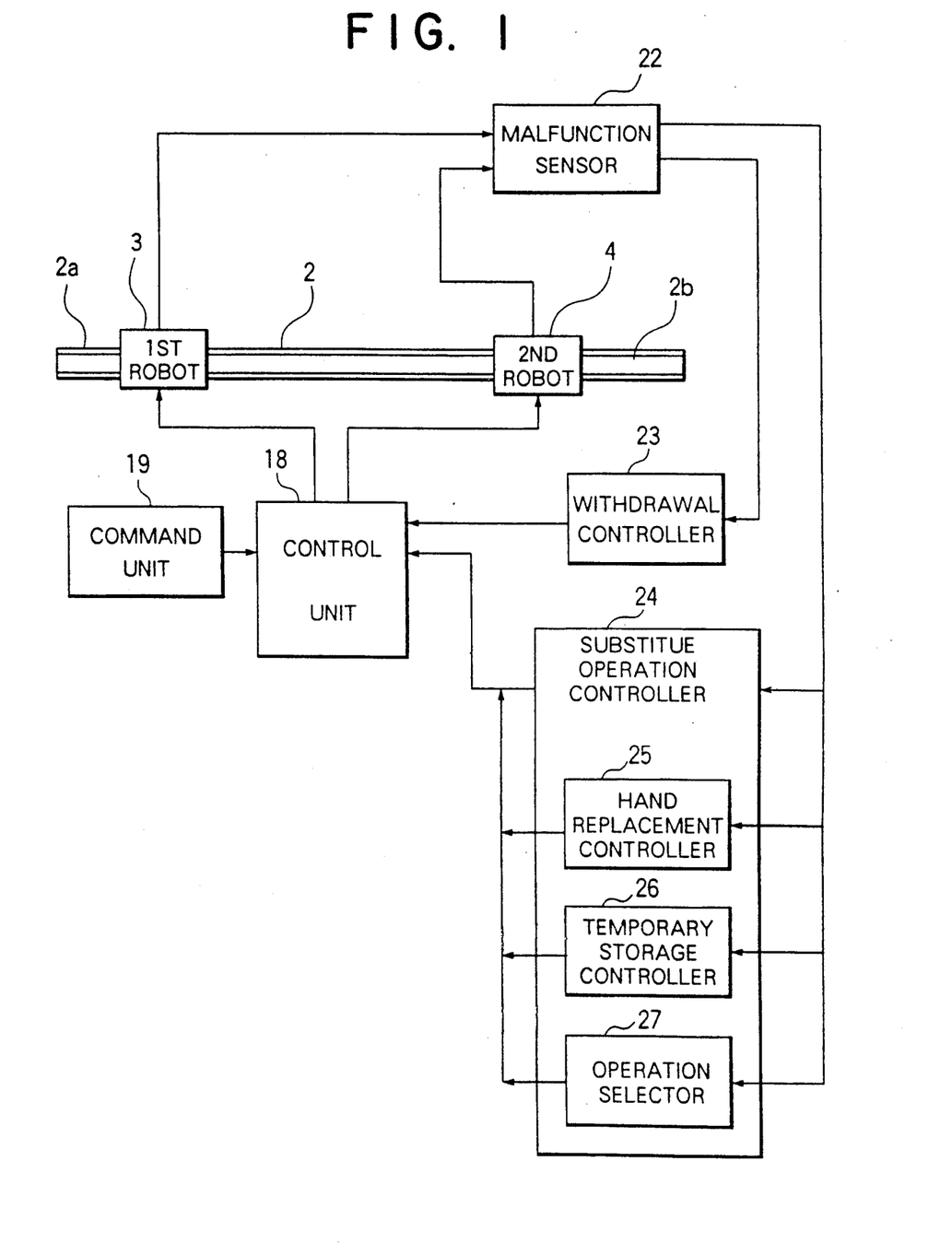
FIG. 1 is a block diagram of a first embodiment of an industrial robot apparatus according to the present invention.
Figure 2:
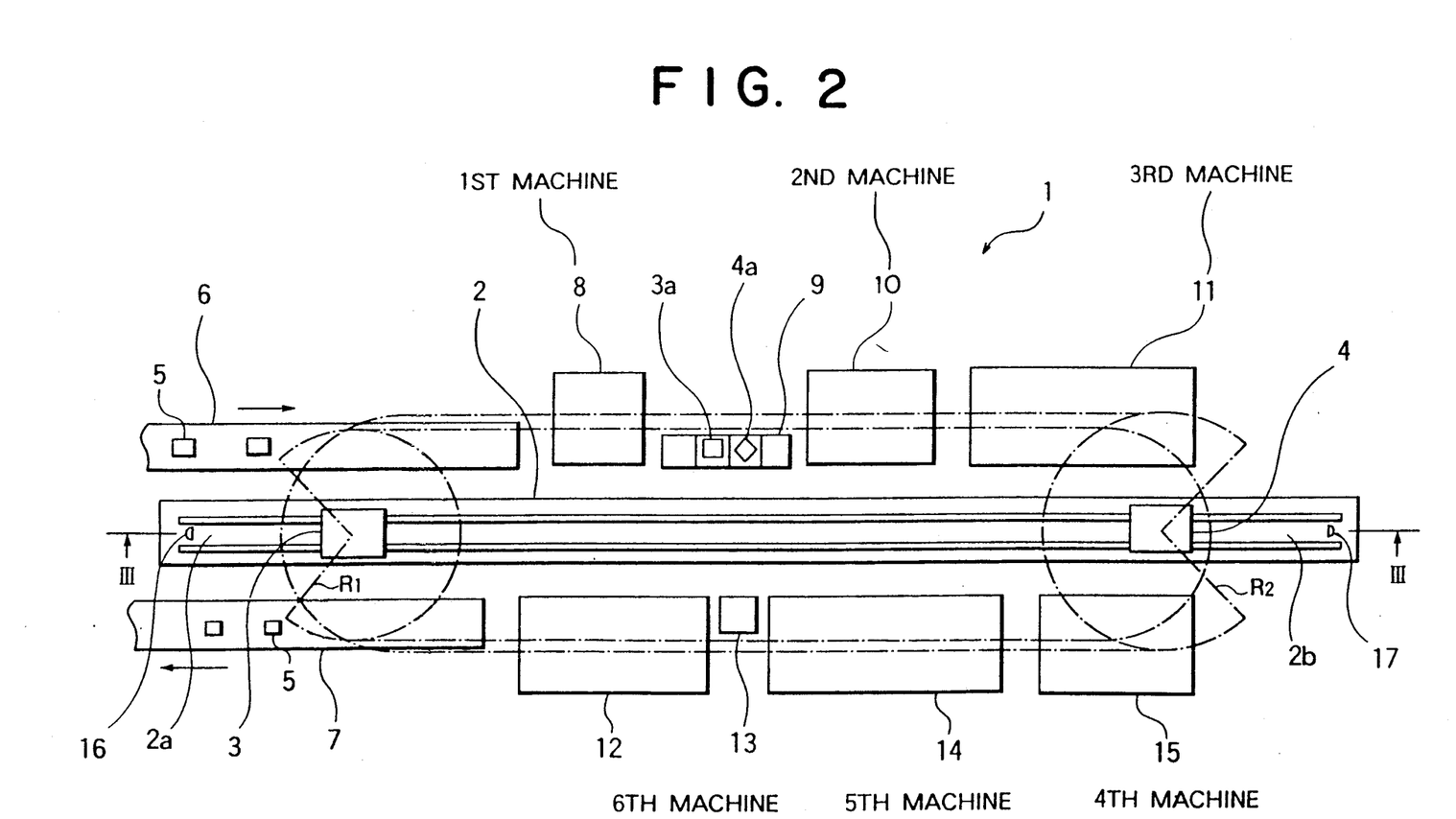
FIG. 2 is a schematic plan view of a manufacturing line employing the embodiment of FIG. 1.

A number of preferred embodiments of an industrial robot apparatus according to the present invention will now be described while referring to the accompanying drawings. FIG. 1 is a block diagram of a first embodiment, and FIG. 2 is a schematic plan view of a manufacturing line employing the embodiment of FIG. 1. As shown in FIG. 1, this embodiment includes a first robot 3 and a second robot 4 which are mounted for movement along a common pathway 2, such as a rail secured to the floor 1 of a work space. A withdrawal space 2a or 2b into which a malfunctioning robot can be withdrawn is formed at each end of the pathway 2. Each withdrawal space is large enough to house a single robot without the robot in the withdrawal space being in the way of the other robot. The first withdrawal space 2a is used to house the first robot 3 when it malfunctions and the second withdrawal space 2b is used to house the second robot 4 when it malfunctions.

The operation of the robots 3 and 4 is controlled by a control unit 18, which receives commands from a command unit 19. The malfunctioning of either robot is detected by a malfunction sensor 22 connected to the two robots. The malfunction sensor 22 generates output signals to a withdrawal controller 23 and to a substitute operation controller 24.

When the malfunction sensor 22 detects that one of the robots is malfunctioning, the withdrawal controller 23 controls the malfunctioning robot via the control unit 18 so as to withdraw into the corresponding withdrawal space.

The substitute operation controller 24 controls the operation of a normal robot to perform operations in place of a malfunctioning robot. It includes a hand replacement controller 25, a temporary storage controller 26, and an operation selector 27. These components 25-27 provide control signals to a normal robot via the control unit 18.

Figure 3:
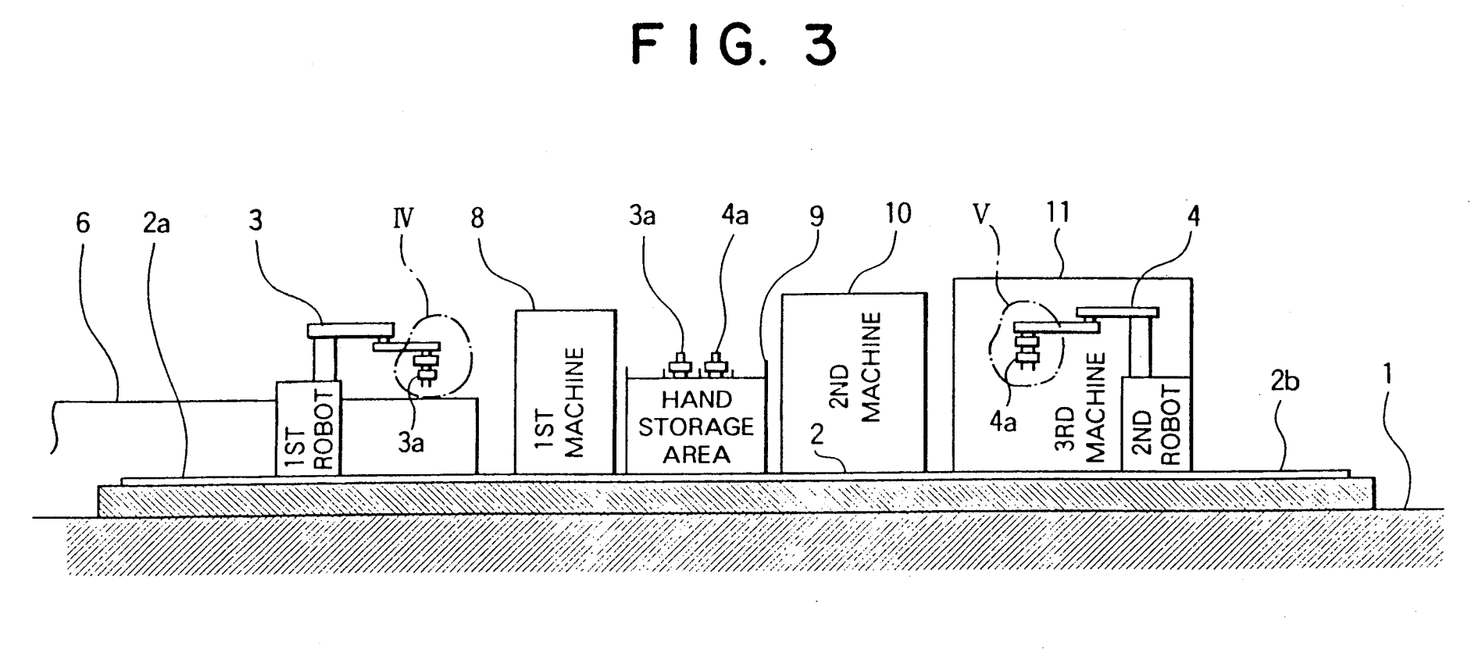
FIG. 3 is a schematic vertical cross-sectional view taken along Line III—III of FIG. 2.

FIG. 2 is a schematic plan view of an example of a manufacturing line employing the embodiment of FIG. 1, and FIG. 3 is a schematic vertical cross-sectional view taken along Line III—III of FIG. 2. The manufacturing line includes an incoming conveyor 6 and an outgoing conveyor 7 disposed alongside one end of the pathway 2. The incoming conveyor 6 transports unprocessed parts 5 to the end of the pathway 2 where they can be picked up by the first robot 3. After the parts 5 have been processed, the first robot 3 places them on the outgoing conveyor 7, which transports the processed parts 5 away from the manufacturing line. The manufacturing line also includes a plurality of processing machines in the form of machine tools, although any type of processing machines can be employed. A first machine tool 8, a second machine tool 10, and a third machine tool 11 are disposed in sequence along one side of the pathway 2, while a fourth machine tool 15, a fifth machine tool 14, and a sixth machine tool 12 are disposed in sequence along the opposite side of the pathway 2.

Figure 4:
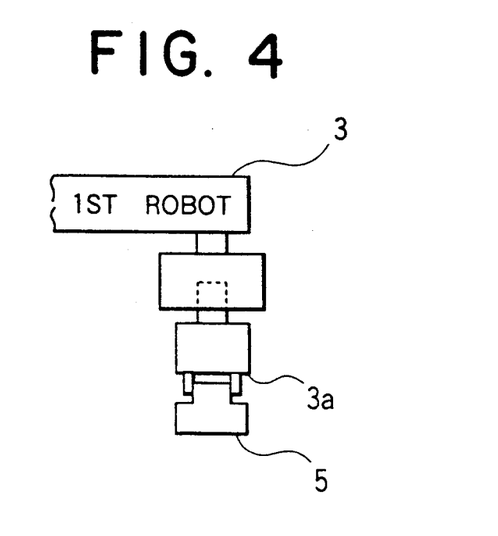
FIGS. 4 and 5 are enlarged views of sections IV and V, respectively, of FIG. 3, showing the arms of the first and second robots in greater detail.
Figure 5:
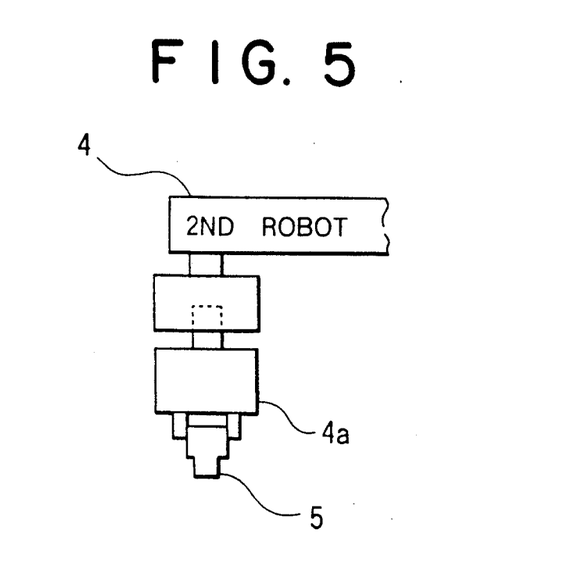

As shown in FIG. 2, each robot 3 and 4 includes a pivoting arm, on the outer end of which a detachable hand 3a and 4a, respectively, is mounted. The radii of movement of the hands of the first and second robots 3 and 4 are R1 and R2, respectively. The robots 3 and 4 need not be identical, but each of the robots should be capable of servicing any of the machine tools. The hands of the robots, which are used for grasping and manipulating parts 5, are shown in greater detail in FIGS. 4 and 5. As each robot handles parts 5 in different stages of manufacture, the hand 3a of the first robot 3 is generally different in structure from the hand 4a of the second robot 4. However, the robots are constructed such that either hand 3a or 4a can be mounted on either robot 3 or 4. Each robot may employ a plurality of different hands as it services different machine tools. When not in use, the hands 3a and 4a are placed in a storage area 9 where they can be accessed by either robot. A temporary storage area 13 for parts 5 being processed is also disposed along the pathway in a location where it can be reached by either robot.

Position sensors 16 and 17 are mounted on the pathway 2 in withdrawal spaces 2a and 2b, respectively. Each sensor detects when a robot has been withdrawn into the corresponding withdrawal space and generates an output signal which is provided to the control unit 18.

Figure 7:
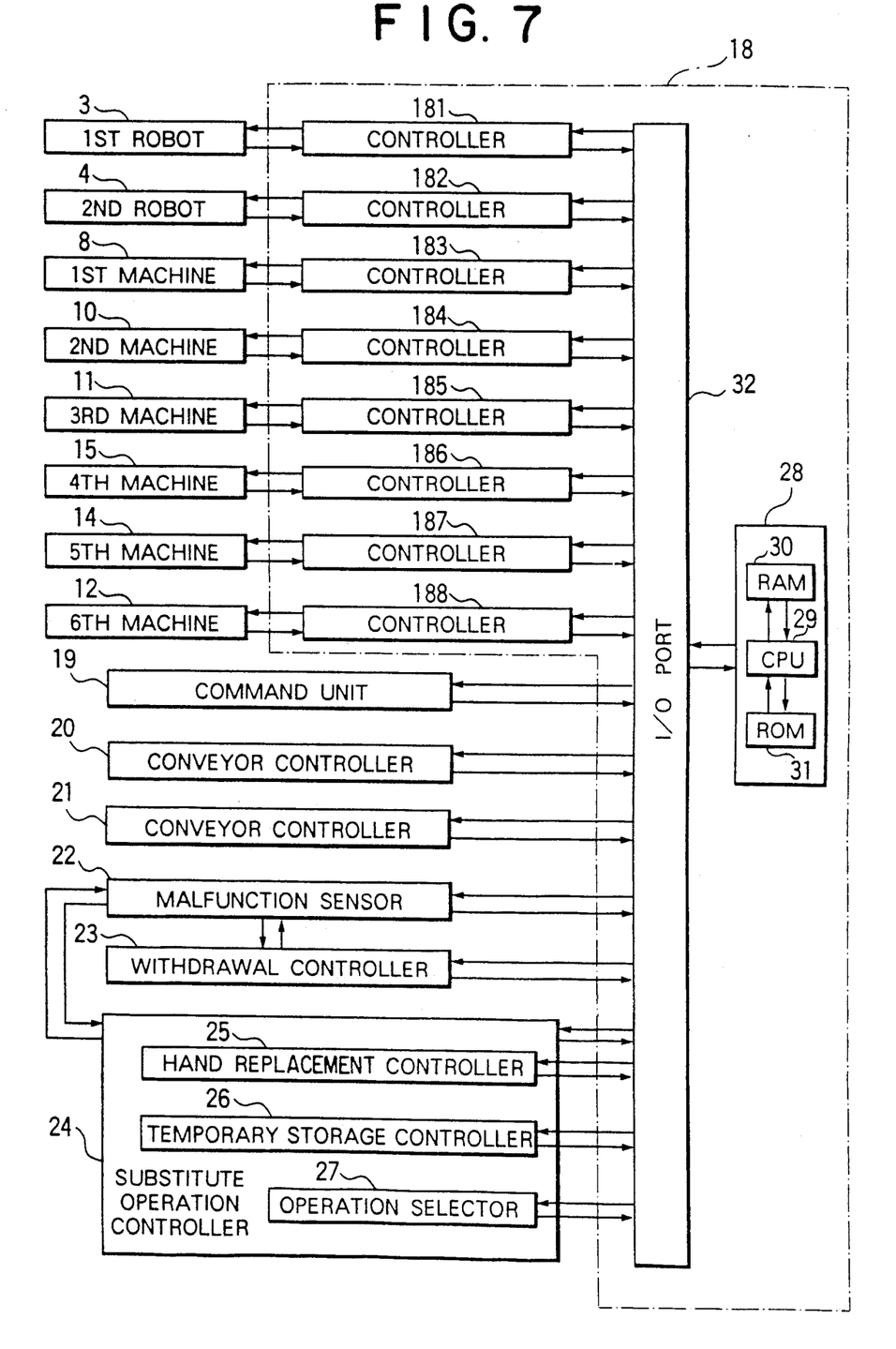
FIG. 7 is a block diagram of a control arrangement for the embodiment of FIG. 1.

FIG. 7 schematically illustrates the control unit 18 and other control components for the embodiment of FIG. 1 in greater detail. The control unit 18 includes first and second robot controllers 181 and 182 which provide control signals for the first and second robots 3 and 4, respectively. First through sixth machine tool controllers 183—188 provide control signals for the first through sixth machine tools, respectively. The controllers 181 and 188 are connected with a computer 28 by an I/0 port 32. The computer 28 includes a CPU 29, a RAM 30, and a ROM 31. The incoming conveyor 6 and the outgoing conveyor 7 are controlled by conveyor controllers 20 and 21, respectively, which are connected to the computer 28 by the I/0 port 32. The command unit 19, the malfunction sensor 22, the withdrawal controller 23, and the substitute operation controller 24 are also connected to the computer 28 by the I/0 port 32.

During the normal operation of the manufacturing line of FIG. 2, the first robot 3, the second robot 4, the incoming conveyor 6, the outgoing conveyor 7, and the machine tools receive instructions from the command unit 19 through the control unit 18. The incoming conveyor 6 successively transports unprocessed parts 5 to a position near the left end of the pathway 2 in FIG. 2. At predetermined time intervals, the first robot 3 picks up a part 5 from the incoming conveyor 6 and carries the part 5 to the first machine tool 8, which performs a manufacturing process on the part 5. When the first machine tool 8 is finished processing the part 5, the first robot 3 then carries the part 5 from the first machine tool 8 to the second machine tool 10, which performs another manufacturing process on the part 5. When the second machine tool 10 is done processing the part 5, it is grasped by the second robot 4 and carried to the third machine tool 11, which performs yet another manufacturing process on the part 5. The second robot 4 then carries the part 5 to the fourth machine tool 15 and the fifth machine tool 14 in succession, each of which performs a manufacturing process on the part 5. When the fifth machine tool 14 is done processing the part 5, it is again grasped by the first robot 3 and carried to the sixth machine tool 12 for further processing. After the sixth machine tool 12 is done with the part 5, the first robot 3 places the now processed part 5 onto the outgoing conveyor 7, which transports the part 5 away from the manufacturing line.

In this manner, a whole series of manufacturing processes are sequentially performed on a part 5 by the six machine tools. During normal operation, the first machine tool 8 and the sixth machine tool 12 are serviced entirely by the first robot 3. The third machine tool 11 and the fourth machine tool 15 are serviced entirely by the second robot 4. In contrast, the second machine tool 10 and the fifth machine tool 14 are serviced by both robots 3 and 4.

Data on the positions and operating states of the robots, the presence or absence of parts on each of the machine tools and the conveyors, and similar information is input to the control unit 18, which processes the data and automatically controls the various components of the manufacturing line so as to carry out continuous processing of the parts 5.

The operation of this embodiment when the second robot 4 malfunctions in the middle of processing will now be described while referring to the flow charts in FIGS. 8 and 9.

Figure 6:
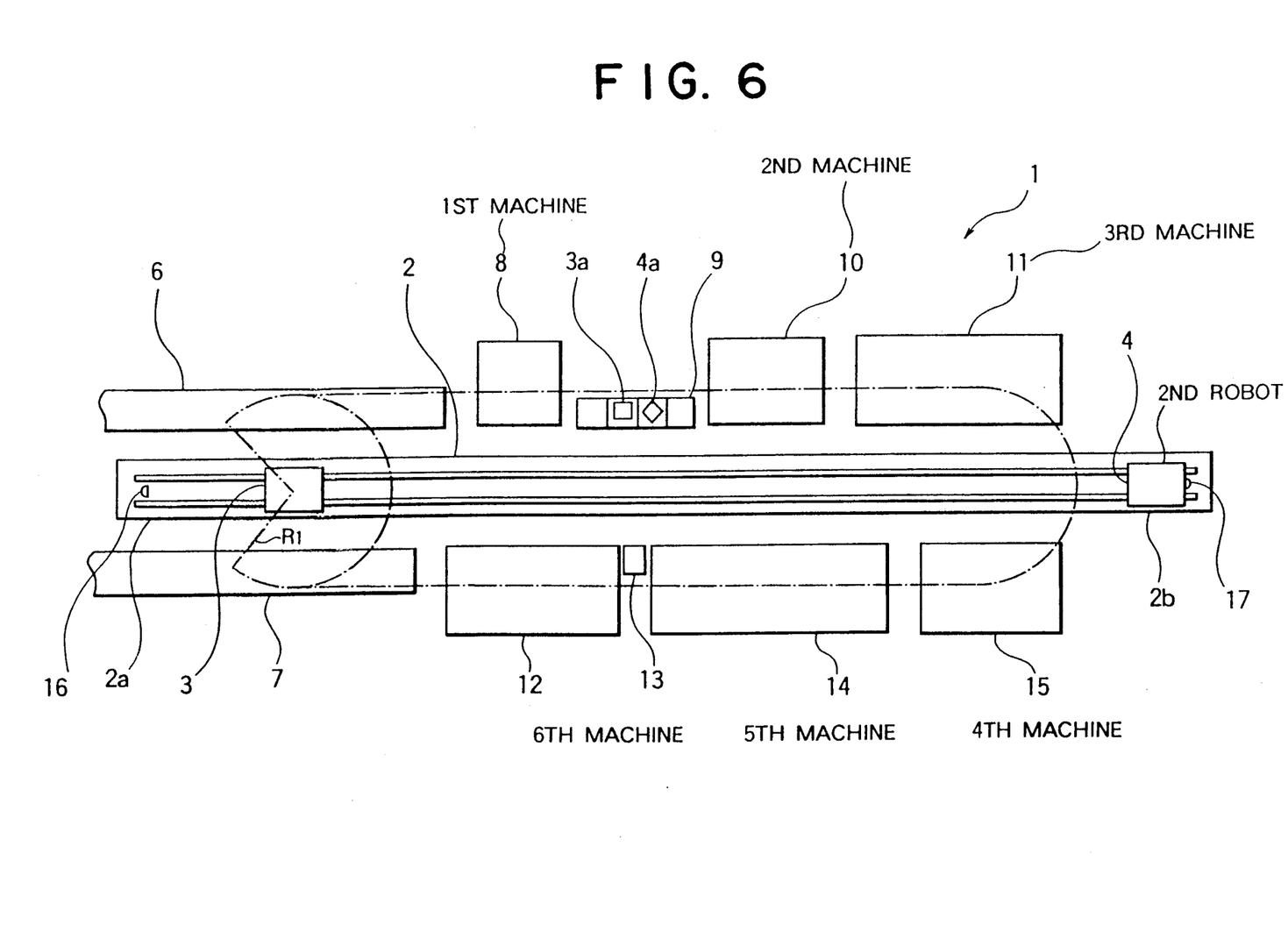
FIG. 6 is a schematic plan view of the manufacturing line of FIG. 2 when the second robot is malfunctioning.

When the second robot 4 malfunctions, in Step 33, the malfunction sensor 22 generates a malfunction signal. In response to the malfunction signal, the computer 28 stops both robots in Step 34. Then, in Step 35, the withdrawal controller 23 controls the second robot 4 so as to withdraw into withdrawal space 2b where it will not interfere with the movement of the first robot 3. FIG. 6 illustrates the manufacturing line when the second robot 4 has been withdrawn. If the malfunction of the second robot 4 is such that the second robot 4 is unable to move by itself, the malfunction signal alerts a human operator, who manually moves the second robot 4 into the second withdrawal space 2b. When the second robot 4 enters the second withdrawal space 2b, in Step 36, position sensor 17 is activated and generates an output signal to indicate that withdrawal has been completed. In Step 37, the operation selector 27 automatically selects an optimal substitute operation to be carried out by the first robot 3 in place of the second robot 4 from a plurality of operations which could be performed. In Step 38, the first robot 3 is instructed to perform the selected substitute operation, and in Step 39, the first robot 3 performs the substitute operation in place of the malfunctioning second robot 4. In Step 40, it is determined whether the malfunctioning robot (the second robot 4) has been repaired yet. This is determined based on the output of the malfunction sensor 22, which is de-energized when the second robot 4 is no longer malfunctioning. If repair has been completed, in Step 41, the apparatus returns to normal operation. If the second robot 4 is still malfunctioning, then Step 39 is returned to and the first robot 3 continues to substitute for the second robot 4.

Figure 8:
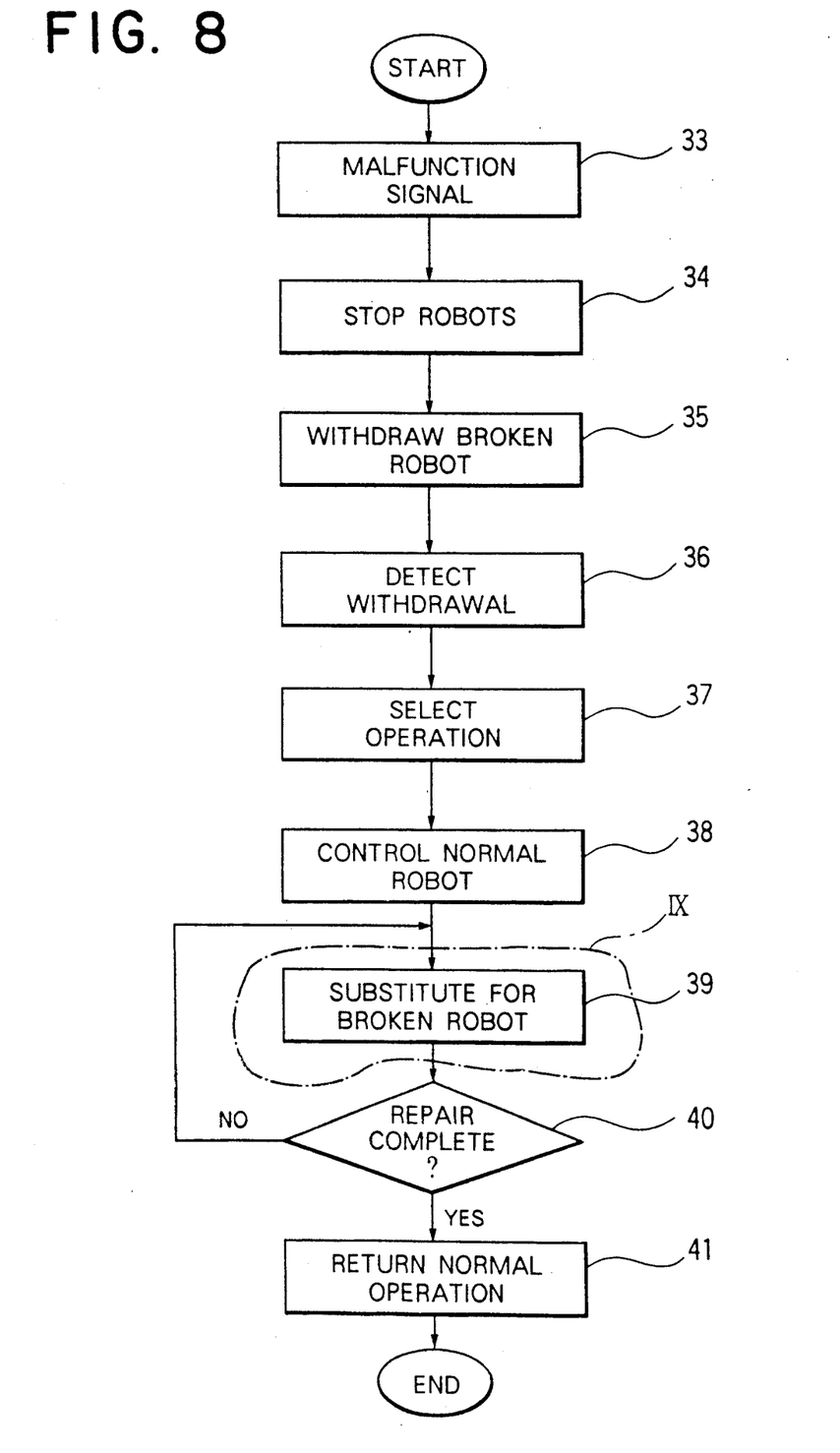
FIGS. 8 and 9 are flow charts of the operation of the control arrangement of FIG. 7.
Figure 9:
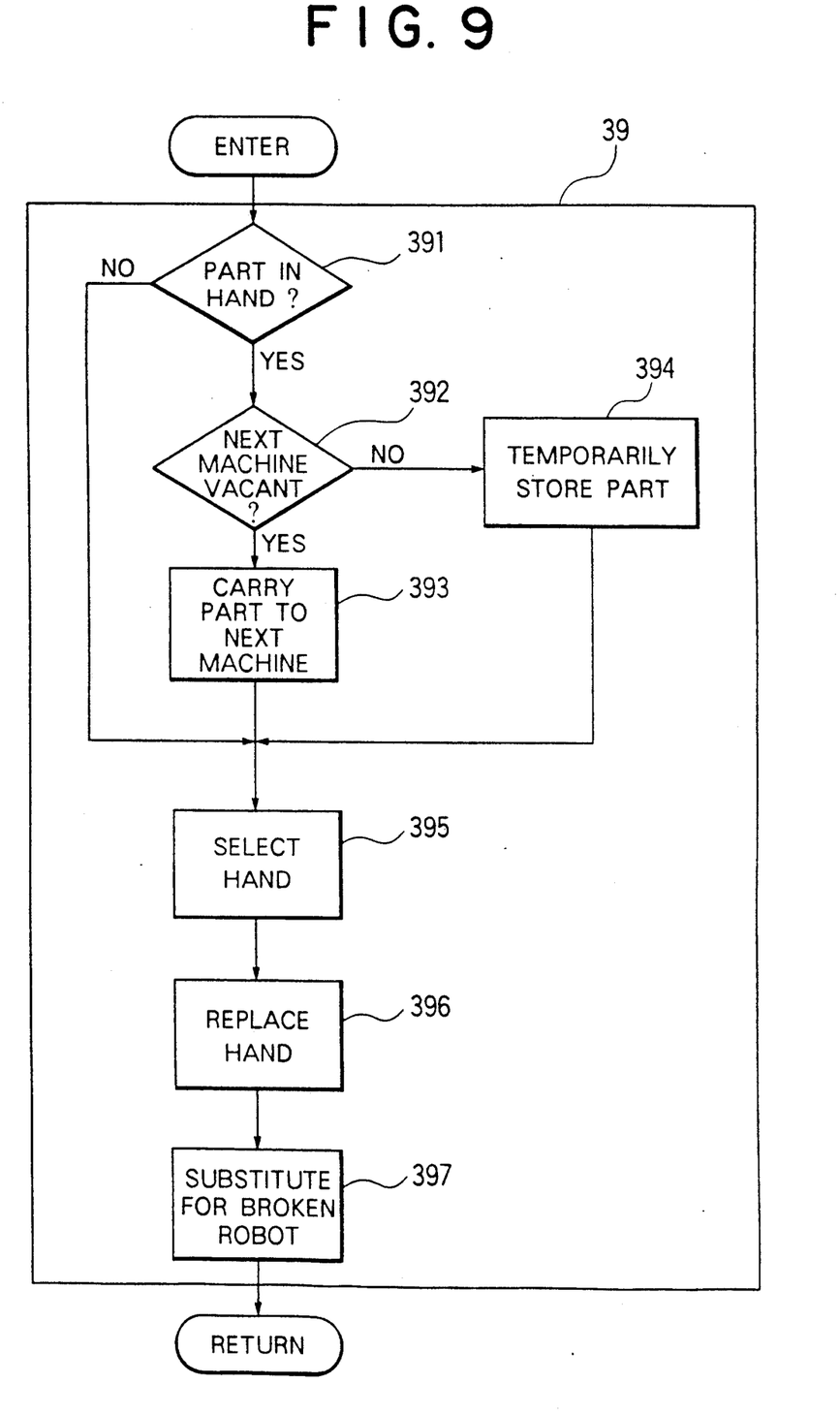

The procedure of controlling the first robot 3 to substitute for the second robot 4 in Step 39 of FIG. 8 is illustrated in greater detail in the flow chart of FIG. 9. First, in Step 391, it is determined whether the first robot 3 is grasping a part 5 in its hand 3a. If the first robot 3 is not grasping a part 5, the routine jumps to Step 395. If the first robot 3 is grasping a part 5, then in Step 392, it is determined whether the next machine tool in the manufacturing line is vacant. If it is vacant, in Step 393 the first robot 3 caries the grasped part 5 to the next machine tool. If the next machine tool is not vacant at this time, in Step 394, the first robot 3 is controlled by the temporary storage controller 26 to temporarily store the part 5 which it is grasping in the temporary storage area 13.

The hand 3a of the first robot 3 is now empty, so the first robot 3 proceeds to substitute for the second robot 3. However, as the first robot 3 and the second robot 4 generally employ different types of hands, it is necessary to replace the hand 3a of the first robot 3 with a suitable hand 4a for the second robot 4. Therefore, in Step 395, the hand replacement controller 25 selects a suitable hand 4a to be used by the first robot 3, and in Step 396, the hand 3a of the first robot 3 is replaced by one of the hands 4a for the second robot 4 at the hand storage area 9. In Step 397, the first robot 3 then performs the operation that was selected in Step 37 in place of the malfunctioning second robot 4.

By alternating its own operations with the substitute operations which are normally allotted to the second robot 4, the first robot 3 is able to perform all the operations of both robots 3 and 4. Therefore, the manufacturing line can continue to function without interruption while the second robot 4 is being repaired.

When the first robot 3 malfunctions while the second robot 4 is functioning normally, the first robot 3 is withdrawn into the first withdrawal space 2a, and the second robot 4 acts as a substitute for the first robot 3 in a manner similar to that described with respect to FIGS. 8 and 9.

Figure 10:
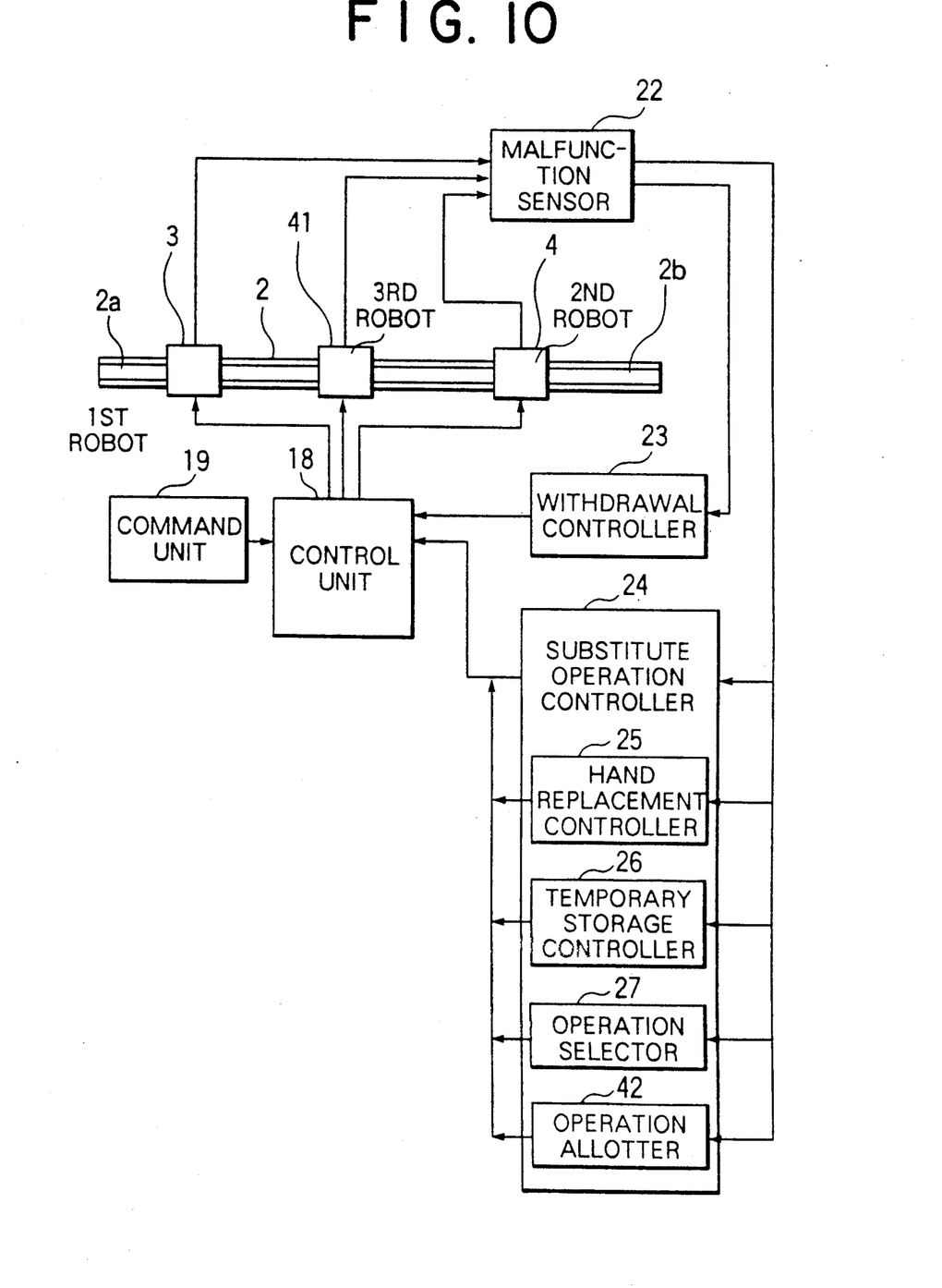
FIG. 10 is a block diagram of a second embodiment of an industrial robot apparatus.
Figure 11:
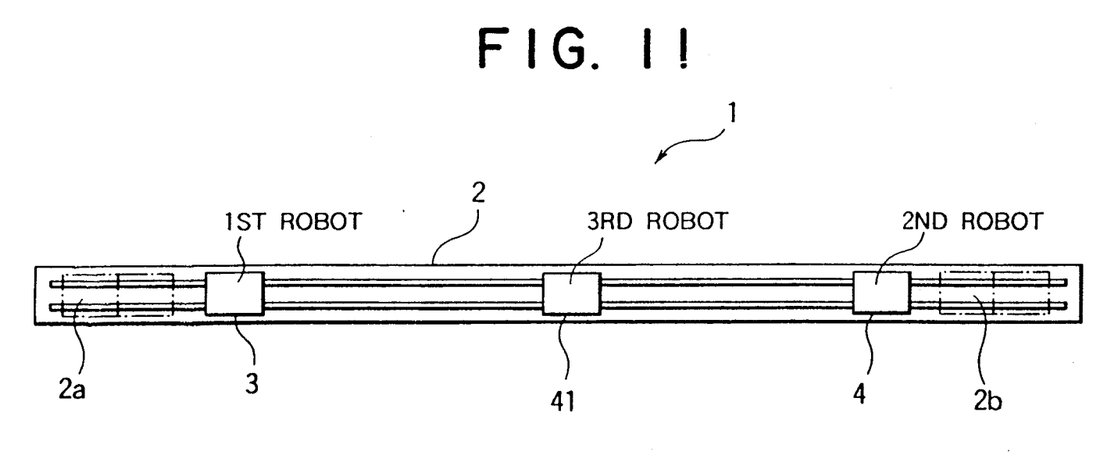
FIG. 11 is an enlarged plan view of the pathway and the robots of FIG. 10.

The embodiment of FIGS. 1 through 9 employs only two robots 3 and 4, but the number of robots is not critical. FIGS. 10 and 11 illustrate a second embodiment of the present invention which is equipped with three robots. FIG. 10 is a block diagram of this embodiment, and FIG. 11 is an enlarged plan view of the robots and the pathway 2. This embodiment is similar in structure to the embodiment of FIG. 1, but it further includes a third robot 41 which is disposed on a pathway 2 between a first robot 3 and a second robot 4. A first withdrawal space 2a and a second withdrawal space 2b are formed at opposite ends of the pathway 2. Each withdrawal space is large enough to house two of the robots at the same time. The substitute operation controller 24 of this embodiment is similar to the one used in the first embodiment but further includes an operation allotter 42. When one or more of the robots malfunctions, the operation allotter 42 divides up the operations which are selected by the operation selector 27 and allots the operations among the normal robots in accordance with the malfunction of the malfunctioning robot. The structure of this embodiment is otherwise the same as that of the first embodiment.

During the operation of this embodiment, if the first robot 3 malfunctions, it is automatically moved into the first withdrawal space 2a, and the operations which would normally be performed by the first robot 3 are allotted to one or both of the second robot 4 and the third robot 41 by the operation allotter 42. Therefore, manufacturing operations can be continued without interruption by the remaining normal robots. Similarly, if the second robot 4 malfunctions, it is withdrawn into the second withdrawal space 2b, and one or both of the remaining normal robots 3 and 41 performs the operations usually performed by the second robot 4.

If the third robot malfunctions 41, since it is between the other two robots, it is necessary to withdraw both the third robot 41 and one of the normal robots 3 or 4 into one of the withdrawal spaces 2a or 2b. Since each robot is capable of performing the same tasks as each of the other robots, it normally does not matter which of the normal robots is withdrawn together with the third robot 41 when the third robot 41 malfunctions. For example, the withdrawal controller 23 can be designed to always withdraw the first robot 3 and the third robot 41 into the first withdrawal space 2a whenever the third robot 41 malfunctions as long as the second robot 4 is functioning normally. After the third robot 41 is withdrawn, the remaining robot which is not in the withdrawal space (the second robot 4, for example) is controlled by the substitute operation controller 24 to perform the operations of both the malfunctioning third robot 41 and the normal robot which was withdrawn together with the third robot 41. Thus, when the third robot 41 malfunctions, a single robot performs the operations normally performed by all three robots.

Similarly, when two robots malfunction at the same time, the malfunctioning robots are withdrawn into one or both of the withdrawal spaces, and the remaining normal robot performs all of the manufacturing operations. As long as a single robot continues to function normally, manufacturing operations can continue smoothly.

Figure 12:
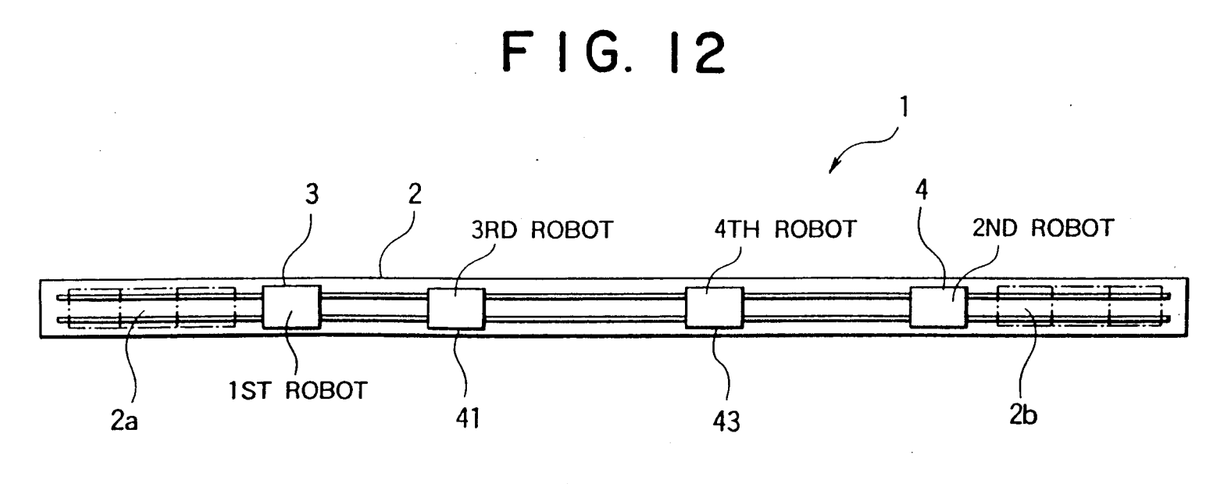
FIG. 12 is a plan view of the pathway and the robots of a third embodiment of the present invention.

FIG. 12 schematically illustrates a manufacturing line employing a third embodiment of the present invention which includes a fourth robot 43 disposed between a second robot 4 and a third robot 41 for movement along a pathway 2. First and second withdrawal spaces 2a and 2b are formed at opposite ends of the pathway 2. Each withdrawal space is large enough to simultaneously house 3 robots. (To generalize, when a robot apparatus according to the present invention has n robots, each withdrawal space is preferably large enough to house n−1 robots). The structure of this embodiment is otherwise the same as that of the embodiment of FIG. 10. Whenever one of the robots malfunctions, the malfunctioning robot is withdrawn by a withdrawal controller 23 into one of the withdrawal spaces 2a or 2b, and the operations normally performed by the robot or robots in the withdrawal spaces are allotted to the remaining normal robots by an operation allotter 42. Thus, in the same manner as in the preceding embodiments, manufacturing operations can be continued as long as at least one of the robots continues to function normally.

What is claimed is:

1. An industrial robot apparatus comprising:
   a pathway for guiding robots, the pathway having first and second ends;
   first and second robots disposed on the pathway for movement along the pathway;
   first and second withdrawal spaces connected to the first and second ends of the pathway, each of the withdrawal spaces being large enough to house at least one of the robots;
   a malfunction sensor for sensing when one of the robots malfunctions;
   a withdrawal controller responsive to the malfunction sensor for withdrawing a malfunctioning robot into one of the withdrawal spaces;
   a plurality of first detachable hands for use by the first robot and a plurality of second detachable hands for use by the second robot, each of the robots having one of the hands detachably mounted thereon;
   a hand replacement controller for controlling a normal robot to replace a detachable hand thereof with one of the hands for use by a malfunctioning robot when the malfunction sensor detects a malfunction of one of the robots; and
   means for controlling the normal robot to perform the operation normally performed by the malfunctioning robot.

2. A robot apparatus as claimed in claim 1, further comprising:
   a temporary storage area for parts disposed in the vicinity of the pathway; and
   a temporary storage controller for controlling the normal robot to temporarily store a part held in the hand thereof temporary storage area when the malfunction sensor detects a malfunction of one of the robots.

3. A manufacturing apparatus comprising:
   a pathway for guiding robots, the pathway having first and second ends;
   a plurality of processing machines disposed in sequence along the pathway
   a plurality of robots movable along the pathway for transferring parts between the processing machines, each of the robots having a detachable hand capable of grasping a part;
   first and second withdrawal spaces connected to the first and second ends of the pathway, each of the withdrawal spaces being large enough to house n−1 robots, wherein n is the number of robots disposed on the pathway;
   a malfunction sensor for sensing when one of the robots malfunctions;
   a withdrawal controller responsive to the malfunction sensor for withdrawing a malfunctioning robot into one of the withdrawal spaces;
   a hand storage area disposed in the vicinity of the pathway;
   a plurality of hands which are stored in the hand storage area and which can be detachably mounted on any of the robots, each of the hands corresponding to one of the robots;
   an operation allotter responsive to the malfunction sensor for allotting an operation usually performed by a malfunctioning robot to one or more of the remaining normal robots when one of the robots malfunctions;
   a hand replacement controller responsive to the malfunction sensor for controlling a normal robot to which an operation is allotted to replace a hand thereof with a different hand corresponding to the hand of a malfunctioning robot from the hands stored in the hand storage area; and
   means for controlling a normal robot to which an operation is allotted by the operation allotter to perform the allotted operation in place of the malfunctioning robot.

4. A method for controlling an industrial robot apparatus having a plurality of robots movable along a pathway, each robot having a detachable hand, the method comprising:
   sensing the operating state of each of the robots;
   withdrawing a malfunctioning robot into a withdrawal space connected to the pathway when a malfunction is detected;
   replacing the hand of a normal robot with a hand corresponding to the hand of the malfunctioning robot; and
   controlling the normal robot to perform an operation usually performed by the malfunctioning robot.

5. A method as claimed in claim 4, further comprising:
   determining if the normal robot is grasping a part in the hand thereof when a malfunction is detected; and
   temporarily storing the part before replacing the hand of the normal robot.

* * * * *